United States Patent [19]

Nozawa et al.

[11] Patent Number: 4,782,132

[45] Date of Patent: Nov. 1, 1988

[54] PROCESS FOR PRODUCING A COPOLYESTER

[75] Inventors: Seiichi Nozawa, Yamato; Osamu Kishiro, Atsugi; Atsushi Kasai, Machida; Seigo Okumura, Machida; Ken Honma, Machida; Chieko Muramoto, Ichikawa, all of Japan

[73] Assignee: Mitsubishi Chemical Industries Limited, Tokyo, Japan

[21] Appl. No.: 853

[22] Filed: Jan. 6, 1987

[51] Int. Cl.$^4$ .................... C08G 63/02; C08G 63/18; C08G 63/16; C08F 20/00

[52] U.S. Cl. .................... 528/193; 528/194; 528/179; 528/302; 525/444; 525/448; 525/437

[58] Field of Search ............... 528/193, 194, 302, 179; 525/444, 448, 437

[56] References Cited

U.S. PATENT DOCUMENTS

| | | | |
|---|---|---|---|
| 4,035,356 | 7/1977 | Jackson, Jr. et al. | 528/193 |
| 4,285,852 | 8/1981 | East | 528/193 |
| 4,390,681 | 6/1983 | Deex | 528/193 |
| 4,542,203 | 9/1985 | Ueno et al. | 528/193 |
| 4,560,740 | 12/1985 | Ueno et al. | 528/194 |
| 4,600,764 | 7/1986 | Dicke et al. | 528/194 |

*Primary Examiner*—Harold D. Anderson
*Assistant Examiner*—Dennis R. Daley
*Attorney, Agent, or Firm*—Oblon, Fisher, Spivak, McClelland & Maier

[57] ABSTRACT

A process for producing a copolymeric polyester, which comprises a first step of preparing a copolymeric oligomer by reacting a starting material oligoester or polyester having repeating units of the formula:

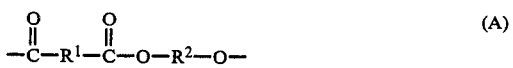

(A)

wherein $R_1$ is a divalent aromatic hydrocarbon group having from 6 to 10 carbon atoms, a divalent alicyclic hydrocarbon group having from 4 to 20 carbon atoms or/and a divalent aliphatic hydrocarbon group having from 1 to 40 carbon atoms (provided a hydrogen atom in the aromatic ring of the aromatic hydrocarbon group may be substituted by a halogen atom or an alkyl or alkoxy group having from 1 to 4 carbon atoms), and $R^2$ is a divalent aliphatic hydrocarbon group having from 2 to 40 carbon atoms, a divalent alicyclic hydrocarbon group having from 4 to 20 carbon atoms, or a divalent radical of polyalkylene oxide having a molecular weight of from 80 to 8000, in an amount from 5 to 95 mol % as represented by the amount of the repeating units constituting the oligoester or polyester, with from 5 to 95 mol % of a hydroxycarboxylic acid of the formula:

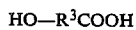

(B)

wherein $R^3$ is a divalent aromatic hydrocarbon group having from 6 to 20 carbon atoms on its aromatic ring (provided a hydrogen atom in the aromatic ring of the aromatic hydrocarbon group may be substituted by a halogen atom or an alkyl or alkoxy group having from 1 to 4 carbon atoms), a second step of acylating the oligomer by an addition of an acylating agent, and a third step of polymerizing the acylated oligomer under reduced pressure, wherein prior to the completion of the second step, a dihydroxyl compound of the formula:

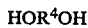

(C)

wherein $R^4$ has the same meaning as $R^1$ in the formula A, or the compound of the formula C and a dicarboxylic acid of the formula:

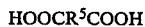

(D)

wherein $R^5$ has the same meaning as $R^1$ in the formula A, are added for reaction.

15 Claims, No Drawings

PROCESS FOR PRODUCING A COPOLYESTER

The present invention relates to a novel process for producing a copolyester having a high modulus and high strength. The copolyester obtained by the process, is capable of forming a thermotropic liquid crystal, and thus it is readily moldable and can be fabricated into commercial products such as moldings, films or fibers.

In recent years, there has been an increasing demand for materials having excellent rigidity, heat resistance and chemical resistance, irrespective of fibers, films or moldings. Polyesters are widely used for moldings of general use. However, many polyesters are inferior in the flexural modulus and flexural strength, and are not suitable for applications where a high modulus or high strength is required. It is known to blend a reinforcing material such as calcium carbonate or glass figers in order to improve these mechanical properties. However, such a method has a disadvantage that the specific gravity of the material increases, and the merit of light weight of the plastics is sacrified, and during the molding operation, abrasion of the molding machine is substantial, thus leading to practical problems.

In recent years, an attention has been drawn to a liquid crystal polyester, as a polyester which does not require any reinforcing material and which is suitable for applications where a high modulus and high strength are required. Such an attention has been paid particularly since W. J. Jackson has reported on a thermal liquid crystal polymer prepared from polyethylene terephthalate and acetoxybenzoic acid in Journal of Polymer Science, Polymer Chemistry Edition, Vol. 14, p.2043-2058 (1976) and in U.S. Pat. No. 3,778,410. In the report, Jackson has stated that the liquid crystal polymer is superior to polyethylene terephthalate at least 5 times in the rigidity, at least 4 times in the strength and at least 25 times in the impact strength, and thus indicated a prospective application thereof as a high performance resin.

On the other hand, the present inventors have previously proposed a process for preparing a process for producing a copolyester, which comprises a first step of preparing a copolymeric oligomer by reacting a starting material oligoester or polyester having repeating units of the formula:

$$-\overset{O}{\underset{\|}{C}}-R^1-\overset{O}{\underset{\|}{C}}-O-R^2-O- \quad (A)$$

wherein $R^1$ is a divalent aromatic hydrocarbon group having from 6 to 20 carbon atoms, a divalent alicyclic hydrocarbon group having from 4 to 20 carbon atoms or/and a divalent aliphatic hydrocarbon group having from 1 to 40 carbon atoms (provided a hydrogen atom in the aromatic ring of the aromatic hydrocarbon group may be substituted by a halogen atom or an alkyl or alkoxy group having from 1 to 4 carbon atoms), and $R^2$ is a divalent aliphatic hydrocarbon group having from 2 to 40 carbon atoms, a divalent alicyclic hydrocarbon group having from 4 to 20 carbon atoms, or a divalent radical or polyalkylene oxide having a molecular weight of from 80 to 8000, in an amount of from 5 to 95 mol % as represented by the amount of the repeating units constituting the oligoester or polyester, with from 5 to 95 mol % of a hydroxycarboxylic acid of the formula:

$$HO-R^3COOH \quad (B)$$

wherein $R^3$ is a divalent aromatic hydrocarbon group having from 6 to 20 carbon atoms on its aromatic ring (provided a hydrogen atom in the aromatic ring of the aromatic hydrocarbon group may be substituted by a halogen atom or an alkyl or alkoxy group having from 1 to 4 carbon atoms), a second step of acylating the copolymeric oligomer by an addition of an acylating agent, and a third step of polymerizing the acylated oligomer under reduced pressure (Japanese Unexamined patent publication Nos. 186525/1985 and 245630/1985).

Further, the present inventors have also proposed a process wherein the polymerization rate is high and whereby the sublimated substance can remarkably be reduced (Japanese Unexamined patent publication No. 181825/1986). However, the copolyesters obtained by such a process are not fully satisfactory in the heat stability.

Under the circumstances, the present inventors have conducted extensive research, and as a result have found a process whereby copolyesters having excellent thermal stability can be produced.

Namely, the present invention provides a process for producing a copolymeric polyester, which comprises the above-mentioned three steps, i.e. a first step of preparing the copolymeric oligomer, a second step of acylating the oligomer by an addition of an acylating agent, and a third step of polymerizing the acylated oligomer under reduced pressure, wherein prior to the completion of the second step, a dihydroxyl compound of the formula:

$$HOR^4OH \quad (C)$$

wherein $R^4$ has the same meaning as $R^1$ in the formula A, or the compound of the formula C and a dicarboxylic acid of the formula:

$$HOOCR^5COOH \quad (D)$$

wherein $R^5$ has the same meaning as $R^1$ in the formula A, are added for reaction.

Now, the present invention will be described in detail with reference to the preferred embodiments.

Copolyesters produced by said processes, contain repeating units of the formula:

$$-O-R^2-O-R^3-\overset{\|}{\underset{O}{C}}- \quad (G)$$

wherein $R^2$ and $R^3$ have the same meanings as $R^2$ and $R^3$ in the formulas A and B, in the oligoester prepared by the first step, whereby the terminal —OH groups and —COOH groups are unbalanced, with the terminal —COOH groups being excessive. Thus, in such a copolymer, not only OH groups but also COOH groups are likely to react with the acylating agent to form acid anhydride bonds, or terminal carboxylic acids are likely to remain in the finally obtained copolymeric polyester. This is believed to be the reason why the copolyester is unstable against heat.

Whereas, in the present invention, a dihydroxy compound of the forula C is added in an amount equal to or more than the stoichiometric amount of the excess —COOH groups formed in the first step, or the dihydroxy compound of the formula C and the dicarboxylic acid of the formula D are added wherein the compound of the formula C is used in an amount of at least stoichiometric relative to the dicarboxylic acid of the formula D. The above additive i.e. the compound of the formula C alone or the combination of the compounds of the formulas C and D, is added prior to the completion of the second step (acylation), followed by a polycondensation reaction under reduced pressure, whereby copolyesters having excellent heat stability can be produced.

In order to prepare the polyester or oligoester of the formula A, a carboxylic acid of the formula E:

$$HOOCR^1COOH \qquad (E)$$

wherein $R^1$ is as defined above with respect to the forula A, or an ester thereof is employed. Such a carboxylic acid includes terephthalic acid, methoxyterephthalic acid, ethoxyterephthalic acid, fluoroterephthalic acid, chloroterephthalic acid, methylterephthalic acid, isophthalic acid, phthalic acid, methoxyisophthalic acid, diphenylmethane-4,4'-dicarboxylic acid, diphenylmethane-3,3'-dicarboxylic acid, diphenylether-4,4'-dicarboxylic acid, diphenyl-4,4't-dicarboxylic acid, naphthalene-2,6-dicarboxylic acid, naphthalene-1,5-dicarboxylic acid, naphthalene-1,4-dicarboxylic acid, adipic acid, sebacic acid, azelaic acid, suberic acid, dodecane dicarboxylic acid, 3-methylazelaic acid, glutaric acid, succinic acid, cyclohexane-1,4-dicarboxylic acid, cyclohexane-1,3-dicarboxylic acid and cyclopentane-1,3-dicarboxylic acid. These acids may be used in combination as a mixture, and any one of those represented by the formula E may be employed.

Specific Examples of a diol of the formula F:

$$HOR^2OH \qquad (F)$$

wherein $R^2$ is as defined above with respect to the formula A, used for the preparation of the polyester or oligoester of the formula A, include ethylene glycol, 1,3-propanediol, 1,2-propanediol, 1,3-butanediol, 1,4-butanediol, neopentyl glycol, 1,6-hexanediol, 1,12-dodecanediol, cyclohexane-1,4-diol, cyclohexane-1,3-diol, cyclohexane-1,2-diol, cyclopentane-1,3-diol, diethylene glycol, polyethlene glycol, hydroquinone, resorcinol, bisphenol A, methylhydroquinone, chlorohydroquinone and 2,6-naphthalenediol. These diols may be used in combination as a mixture, and any one of those represented by the formula F may be used.

As the polyester or oligoester of the formula A, any one of those represented by the formula A may be used. However, from the availability, polyethylene terephthalate, polybutylene terephthalate and their oligomers are preferred. Particularly preferred are polyethylene terephthalate and its oligomers.

As the hydroxycarboxylic acid of the formula B, there may be mentioned p-hydroxybenzoic acid, 4-hydroxy-3-chlorobenzoic acid, m-hydroxybenzoic acid, 4-hydroxy-3,5-dimethylbenzoic acid, 2-oxy-6-naphthoic acid, 1-oxy-5-naphthoic acid, 1-hydroxy-4-naphtoic acid, syrinic acid, vanillic acid, and 4-hydroxy-3-methylbenzoic acid. In order to maintain the melt anisotropy, it is preferred to use p-hydroxytenzoic acid alone. However, any one of the hydroxycarboxylic acids represented by the formula B may be employed, or they may be used in combination as a mixture.

The reaction of the hydroxycarboxylic acid of the formula B and the polyester or oligoester of the formula A is conducted usually at a temperature of from 200 to 350° C., preferably from 220° to 300° C., for a period within a range of from 5 minutes to 10 hours, preferably from 20 minutes to 5 hours.

The reaction is conducted usually until the residual amount of the hydroxycarboxylic acid becomes not higher than 70 mol %, preferably not higher than 50 mol %, more preferably not higher than 40 mol %, relative to the charged amount.

The reaction may be conducted non-catalytically, but may be conducted with an addition of a catalyst as the case requires.

As the diol of the formula C in the present invention, any one of those represented by the formula C may be employed. Specific examples include hydroquinone, resorcinol, methylhydroquinone, chlorohydroquinone, acetylhydroquinone, acetoxyhydroquinone, nitrohydroquinone, dimethylaminohydroquinone, 1,4-dihydroxynaphthol, 1,5-dihydroxynaphthol, 1,6-dihydroxynaphthol, 2,6-dihydroxynaphthol, 2,7-dihydroxynaphthol, 2,2'-bis(4-hydroxyphenyl)propane, 2,2'-bis(4-hydroxy-3,5-dimethylphenyl)propane, 2,2'-bis(4-hydroxy-3,5-dichlorophenyl)propane, 2,2'-bis(4-hydroxy-3-methylphenyl)propane, 2,2'-bis(4-hydroxy-3-chlorophenyl)propane, bis(4-hydroxyphenyl)methane, bis(4-hydroxy-3,5-dimethylphenyl)methane, bis(4-hydroxy-3,5-dichlorophenyl)methane, bis(4-hydroxy-3,5-dibromophenyl)methane, 1,1-bis(4-hydroxyphenyl)cyclohexane, 4,4'-dihydroxydiphenyl-bis(4-hydroxyphenyl)-ketone, bis(4-hydroxy-3,5-dimethylphenyl)-ketone, bis(4-hydroxy-3,5-dichlorophenyl)-ketone, bis(4-hydroxyphenyl)sulfide, bis(4-hydroxy-3-chlorophenyl)sulfide, bis(4-hydroxyphenyl)sulfone and bis(4-hydroxy-3,5-dichlorophenyl)ether.

The addition of the compound of the formula C alone, may be conducted at any time prior to the completion of the second step. However, it is particularly preferred to conduct the addition after the completion of the reaction of the first step.

The compound of the formula C is added preferably in an amount of from 1 to 100 mol % relative to the amount of the hydroxycarboxylic acid of the formula B. As mentioned above, it is particularly preferred to employ it in an amount equal to or more than the stoichiometric amount of the excess —COOH groups due to the formation of units of the formula G. More specifically, it is preferred to add it in such an amount that "the terminal OH groups—the terminal COOH groups" . . . (I) will be at least 0 equivalent, preferably at least 5 equivalent, more preferably at least 20 equivalent, relative to 100 equivalent of the $OR^2O$ residues of the compound of the formula A. Here, the amount of the terminal groups can be preliminarily determined by analyzing the reaction solution prior to the completion of the second step. Further, the terminal groups may be measured by H-NMR in a solvent such as DMSO. For example, the concentrations of the terminal groups may be obtained, for example, based on the following:

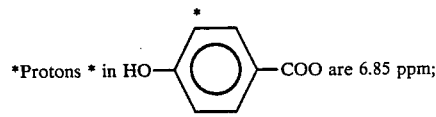

*Protons * in HO—⟨O⟩—COO are 6.85 ppm;

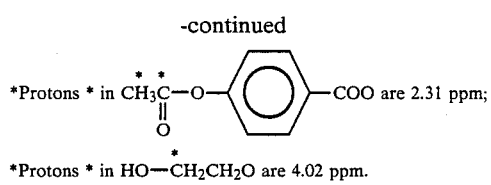

*Protons * in $CH_3\underset{O}{\underset{\|}{C}}-O-\langle\bigcirc\rangle-COO$ are 2.31 ppm;

*Protons * in $HO-\overset{*}{C}H_2CH_2O$ are 4.02 ppm.

In the case of an acid, with respect to a methyl-esterified product:

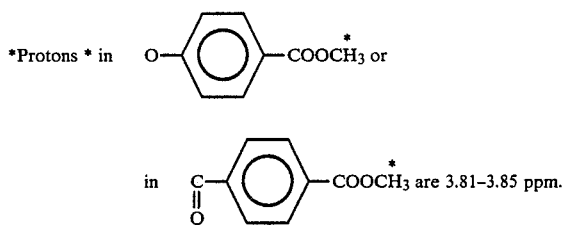

*Protons * in $O-\langle\bigcirc\rangle-COO\overset{*}{C}H_3$ or in $\underset{O}{\underset{\|}{C}}-\langle\bigcirc\rangle-COO\overset{*}{C}H_3$ are 3.81–3.85 ppm.

On the other hand, it is also possible to calculate "the terminal OH groups—the terminal COOH groups" from the measurement of the terminal groups of the polyester or oligoester of the formula A and from the measurement of the units of the formula G i.e.

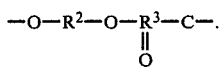

It is also preferred to employ two or more compounds of the formula C to control the physical properties. For instance, by a proper combination of hydroquinone or 4,4-bisphenol capable of increasing the liquid crystallinity and resorcinol or 2,2'-bis(4-hydroxyphenyl)propane capable of decreasing the liquid crystallinity, it is possible to obtain the desired mechanical properties without changing the composition of the compounds of the formulas A and B in the starting material.

In the case where both additives of the formulas C and D are added, if the compounds of the formulas A and B are used in a total amount of from 5 to 95 mol % relative to the total amount of the compounds of the formulas A, B, C and D, the compounds of the formulas C and D are employed in a total amount of from 5 to 95 mol %, and the compound of the formula C is used in an amount of at least stoichiometric relative to the compound of the formula D. In such a case, it is preferred to employ the compounds of the formulas C and D in a total amount of from 80 to 20 mol %, relative to the total amount of the compounds of the formulas A and B being from 20 to 80 mol %. In such a case, it is preferred that the compound of the formula B is used in an amount of from 15 to 90 mol % relative to from 85 to 10 mol % of the compound of the formula A, and the compound of the formula C is used in an amount greater by from 1 to 100 mol %, preferably by from 5 to 70 mol %, than the compound of the formula D. However, by properly controlling the reaction of the first step and selecting the type of the oligomer, it is still possible to obtain a polymer having excellent heat stability even when the compounds of the formulas C and D are used in equimolar amounts.

Two or more compounds may be used for each of the compounds of the formulas C and D, or two or more compounds may be used for one of them only. It is possible to control the modulus of elasticity and elongation at break by properly selecting the structures of the compounds of the formulas C and D.

If the compound of the formula C or the compounds of the formulas C and D are added after the completion of the acylation of the second step, there will be adverse effects such as a decrease in the polymerization rate or occurrence of sublimation.

As the method of addition, the compound of the formula C or the compounds of the formulas C and D may be added in bulk, or may be diluted with a diluent before the addition.

The acylation of the second step is conducted by using an acylating agent usually in an amount of from 0.5 to 2.0 mol times, preferably from 0.7 to 1.5 mol times, as the ratio of (acylating agent)/[(B)+2(C)]. In such a case, the acylating agent is dropwise added preferably over a period of at least 10 minutes, more preferably over a period of at least 20 minutes. The contact with the acylating agent is conducted at a temperature of from 80 to 350° C., preferably from 50° to 200° C., more preferably from 80° to 180° C., if necessary under pressure. The acylation may also be conducted by lowering the temperature of the system to a level of not higher than the boiling point of the acylating agent. The reaction is usually conducted within 5 hours, preferably within a range of from 10 minutes to 3 hours.

The compound of the formula C or the compounds of the formulas C and D may be added prior to the completion of this acylation.

As the acylating agent, acetic anhydride, propionic anhydride, butyric anhydride or benzoic anhydride may be preferably employed. However, it is possible to employ any one of those commonly employed as acylating agents. Among them, acetic anhydride is most popular from the viewpoint of the reactivity and costs.

Next, the polymerization of the third step is conducted usually within a range of from 200° to 350° C., preferably from 220° to 330° C. In this case, it is preferred to gradually reduce the pressure during the initial stage. The reduction of the pressure from 760 mmHg to a level of 1 mmHg is conducted over a period of at least 30 minutes, preferably over a period of at least 60 minutes. It is particularly important to conduct the reduction of the pressure gradually at a rate of from 10 mmHg/min to 1 mmHg/min.

The second step and the third step may be conducted in the absence of a catalyst. However, they may be conducted in the presence of a catalyst, as the case requires.

As the catalysts used in the first, second and third steps, an ester-exchange catalyst, a polycondensation catalyst, an acylating catalyst and a decarboxylic acid catalyst, may be employed. These catalysts may be employed in combination as a mixture. The catalyst is used in an amount of from 5 to 50,000 ppm, preferatly from 50 to 5000 ppm, relative to the polymer.

The intrinsic viscosity $\eta_{inh}$ was measured at 3° C. in a solution of 0.5 g/dl in a mixture of phenol and tetrachloroethane=1:1 (weight ratio). The $\eta_{inh}$ of the final product is at least 0.3 dl/g, preferably at least 0.35 dl/g.

Now, the present invention will be described in further detail with reference to Examples. However, it should be understood that the present invention is by no means restricted by such specific Examples.

EXAMPLE 1

Into a glass polymerizer equipped with a stirrer, a nitrogen inlet and a vacuum port, 51.8 g (0.375 mol) of p-hydroxybenzoic acid, 72.1 g (0.375 mol as the amount of repeating units) of polyethylene terephthalate oligomer ($\eta_{inh}=0.12$ dl/g) and 0.037 g of stannous acetate were charged, and after repeating the vacuuming-nitrogen substitution 3 times, the system was finally filled with nitrogen and kept under a nitrogen stream at a flow rate of 0.5 liter/min. The polymerizer was immersed in an oil bath at a temperature of 260° C., and the content melted in about 30 minutes, whereupon stirring was initiated. The ester exchange was conducted under such a condition for 2 hours to obtain a copolymeric oligomer.

Then, the temperature was permitted to drop to 140° C. in about 30 minutes, and then 8.25 g (0.075 mol) of hydroquinone was added. Then, 67 g (0.657 mol) of acetic anhydride was dropwise added thereto over a period of 30 minutes, and stirring was continued under such a condition for further 1 hour for acylation. Then, the temperature of the oil bath was raised to 275° C. over a period of 2 hours. Then, 0.068 g of zinc acetate dihydrate was added, and the pressure was gradually reduced. After the system was evacuated to a level of 0.3 mmHg, polymerization was conducted for 3 hours. The product was taken out by breaking the glass polymerizer, chipped and then vacuum-dried at 130° C. overnight. The polymer thus obtained was milky white and opaque, and $\eta_{inh}=0.76$.

This polymer was further vacuum-dried at 120° C. for 130 hours, whereby the thermal stability was excellent with $\eta_{inh}=0.75$.

Further, from the results of the IR analysis, no acid anhydride bond was detected.

EXAMPLE 2

Into a glass polymerizer equipped with a stirrer, a nitrogen inlet and a vacuum port, 62.2 g (0.45 mol) of p-hydroxybenzoic acid, 57.7 g (0.30 mol) of polyethylene terephthalate oligomer ($\eta_{inh}=0.12$ dl/g) and 0.036 g of stannous acetate were charged, and the vacuuming-nitrogen substitution was repeated 3 times. Finally, the system was filled with nitrogen and kept under a nitrogen stream at a flow rate of 0.5 liter/min. The polymerizer was immersed in an oil bath at a temperature of 260° C., and the content melted in about 30 minutes, whereupon the stirring was initiated. The ester exchange was conducted under such a condition for 2 hours to obtain a copolymeric oligomer. Then, 8.25 g (0.075 mol) of hydroquinone was added thereto, and then 122.4 g of acetic anhydride was dropwise added over a period of 30 minutes. Stirring was continued under such a condition for further 1 hour for acylation. Then, the temperature of the oil bath was raised to 275° C. over a period of 1 hour. Then, 0.068 g of zinc acetate dihydrate was added thereto, and the pressure was reduced gradually. After the system was evacuated to a level of 0.3 mmHg, polymerization was conducted for 2 hours. The polymer thus obtained had $\eta_{inh}=0.87$. This polymer was further dried in an oven at 120° C. for 130 hours, whereby the thermal stability was excellent with $\eta_{inh}=0.85$.

From the results of the IR analysis, no acid anhydride bond was detected.

COMPARATIVE EXAMPLE 1

The same operation as in Example 2 was conducted except that hydroquinone was added.

The polymer thus obtained had $\eta_{inh}=0.78$.

When this polymer was vacuum-dried at 120° C. for 72 hours, $\eta_{inh}$ decreased substantially to a level of $\eta_{inh}=0.53$.

From the results of the IR analysis, the acid anhydride bonds were observed in an amount of about 10%, relative to the ester bonds.

EXAMPLE 3

The same operation as in Example 1 was conducted except that 25.6 g of 2,2'-bis(4-hydroxyphenyl)propane (bisphenol A) was added instead of hydroquinone in Example 1.

The polymer thus obtained had $\eta_{inh}=0.71$. When it was further dried at 120° C. for 120 hours, the thermal stability was excellent with $\eta_{inh}=0.70$.

From the results of the IR measurement, no acid anhydride bond was detected.

EXAMPLE 4

The same operation as in Example 1 was conducted except that hydroquinone was added from the very beginning.

The polymer thus obtained had $\eta_{inh}=0.72$.

EXAMPLE 5

Into a glass polymerizer equipped with a stirrer, a monomer inlet and a vacuum port, 72.1 g (0.375 mol) of polyethylene terephthalate oligomer ($\eta_{inh}=0.11$ dl/g) and 51.8 g (0.375 mol) of p-hydroxybenzoic acid were charged, and the vacuuming-nitrogen substitution was repeated 3 times. The system was finally filled with nitrogen, and kept under a nitrogen stream at a flow rate of 0.3 liter/min. The polymerizer was immersed in an oil bath at a temperature of 260° C., the content melted in about 30 minutes, whereupon stirring was initiated, and the acidolysis reaction was conducted for 2 hours. Then, the temperature of the oil bath was lowered, and the internal temperature of the polymerizer was lowered in 40 minutes to a level of not higher than 160° C. . When the internal temperature was lowered, 12.4 g (0.113 mol) of hydroquinone was added from the monomer inlet, and 76.6 g of acetic anhydride was dropwise added at 140° C. from a dropping funnel over a period of 30 minutes. The acetylation reaction was conducted under such a condition for 1 hour. Then, the temperature of the oil bath was again raised so that the internal temperature was raised to 275° C. in 1 hour. Then, a solution obtained by dissolving 0.068 g of zinc acetate dihydrate in 1 g of N-methylpyrrolidone, was added thereto, and the pressure was gradually reduced to a level of not higher than 1 mmHg over a period of 1 hour. The reaction was continued under such a condition for 4 hours to complete the polymerization. The product was taken out by breaking the glass polymerizer, chipped and then vacuum-dried at 120° C. overnight.

The polymer thus obtained was dissolved at room temperature at a concentration of 0.5 g/dl in a solvent mixture of phenol/1,1,2,2-tetrachloroethane (50/5) by weight %), and the viscosity $\eta_{inh}$ of the solution was 0.74. This polymer solution was further heated at 110° C. for 1 hour, whereupon $\eta_{inh}$ was 0.73, thus indicating that this polymer was stable against heat in a polar solvent.

COMPARATIVE EXAMPLE 2

The same operation as in Example 5 was conducted except that hydroquinone was used in an amount of 4.1 g (0.0375 mol) instead of 12.4 g, acetic anhydride was used in an amount of 57.4 g, and the polymerization time was changed to 2 hours. The polymer thus obtained, had $\eta_{inh}$ of 0.59 as dissolved at room temperature. This pclymer solution was further heated at 110° C. for 1 hour, whereupon $\eta_{inh}$ was 0.26, thus indicating that this polymer had very poor stability.

EXAMPLE 6

The same operation as in Example 5 was conducted except that the initial acidolysis reaction was conducted at 275° C., hydroquinone was used in an amount of 16.5 g (0.15 mol) and acetic anhydride was used in an amount of 86.2 g. The polymer thus obtained had $\eta_{inh}$ of 0.74 as dissolved at room temperature. This polymer solution was further heated at 110° C. for 1 hour, whereupon $\eta_{inh}$ was 0.72, thus indicating that this polymer had very good stability.

COMPARATIVE EXAMPLE 3

The same operation as in Example 6 was conducted except that hydroquinone was used in an amount of 4.1 g (0.0375 mol) and acetic anhydride was used in an amount of 57.4 g. The polymer thus obtained had $\eta_{inh}$ of 0.55 as dissolved at room temperature. This polymer solution was further heated at 110° C. for 1 hour, whereupon $\eta_{inh}$ was 0.19, thus indicating that this polymer had very poor stability.

EXAMPLE 7

Into a glass polymerizer equipped with a stirrer, a nitrogen inlet and a vacuum port, 51.8 g (0.375 mcl) of p-hydroxybenzoic acid, 72.1 g (0.375 mol as the aount of repeating units) of polyethylene terephthalate oligomer ($\eta_{inh}$=0.098 dl/g) and 0.037 g of stannous acetate were charged, and after repeating the vacuuming-nitrogen substitution 3 times, the system was finally filled with nitrogen and kept under a nitrogen stream at a flow rate of 0.5 liter/min. The polymerizer was immersed in an oil bath at a temperature of 240° C., and the content melted in about 30 minutes, whereupon stirring was initiated. The ester exchange was conducted under such a condition for 2 hours to obtain a copolymeric oligomer.

Then, the temperature was permitted to drop to 140° C. in about 30 minutes, and then 8.25 g (0.075 mol) of hydroquinone was added. Then, 67 g (0.657 mol) of acetic anhydride was dropwise added thereto over a period of 30 minutes, and stirring was continued under such a condition for further 1 hour for acylation. Then, the temperature of the oil bath was raised to 275° C. over a period of 2 hours. Then, 0.068 g of zinc acetate dihydrate was added, and the pressure was gradually reduced. After the system was evacuated to a level of 0.3 mmHg, polymerization was conducted for 3 hours. The product was taken out by breaking the glass polymerizer, chipped and then vacuum-dried at 130° C. overnight. The polymer thus obtained was milky white and opaque, and $\eta_{inh}$=0.70.

This polymer was further dried in an oven at 120° C. for 130 hours, whereby the heat stability was excellent with $\eta_{inh}$=0.70.

Further, from the results of the IR analysis, no acid anhydride bond was detected.

In this system, the acylated oligomer prior to the intiation of the third step was found to contain 57.6 equivalent of terminal OH groups and 30.8 equivalent of terminal COOH groups (each inclusive of acetylated groups) relative to 100 equivalent of —OCH$_2$CH$_2$O— groups, whereby the terminal OH groups—the terminal COOH groups=26.8 equivalent>0 equivalent.

Whereas, the terminal OH groups in the charged polyethylene terephthalate oligomer were 20 equivalent relative to 100 equivalent of —OCH$_2$CH$_2$O—groups, and the terminal COOH groups were 12 equivalent. The resulting ether component was 11 equivalent relative to 100 equivalent of —OCH$_2$CH$_2$O—groups, and the OH groups of the added hydroquinone were 40 equivalent relative to 100 equivalent of —OCH$_2$CH$_2$O—groups. Therefore, the terminal OH groups—the terminal COOH groups prior to the initiation of the third step is calculated to be 20−12−11×2+40= +26 equivalent>0 equivalent, which substantially corresponds to the above result.

The terminal groups of the formed copolymeric polyester comprised substantially 0 equivalent of OH terminal groups, 128 equivalent of

terminal groups and 66 equivalent of COOH terminal groups per 10$^6$ g of the polyester. Thus, the terminals of the copolymeric polyester were rich in OH groups (inclusive of acetylated groups).

EXAMPLE 8

Into a glass polymerizer equipped with a stirrer, a nitrogen inlet and a vacuum port, 62.2 g (0.45 mol) of p-hydroxybenzoic acid, 57.7 g (0.30 mol as the amount of repeating units) of polyethylene terephthalate oligomer ($\eta_{inh}$=0.098 dl/g) and 0.036 g of stannous acetate were charged, and after repeating the vacuuming-nitrogen substitution 3 times, the system was finally filled with nitrogen and kept under a nitrogen stream at a flow rate of 0.5 liter/min. The polymerizer was immersed in an oil bath at a temperature of 260° C., and the content melted in about 30 minutes, whereupon stirring was initiated. The ester exchange was conducted under such a condition for 2 hours to obtain a copolymeric oligomer.

Then, 8.25 g (0.075 mol) of hydroquinone was added. Then, 122.4 g of acetic anhydride was dropwise aded thereto over a period of 30 minutes, and stirring was continued under such a condition for further 1 hour for acylation. Then, the temperature of the oil bath was raised to 275° C. over a period of 1 hour. Then, 0.068 g of zinc acetate dihydrate was added, and the pressure was gradually reduced. After the system was evacuated to a level of 0.3 mmHg, polymerization was conducted for 2 hours. The polymer thus obtained had $\eta_{inh}$=0.87.

This polymer was further dried in an oven at 120° C. for 130 hours, whereby the heat stability was excellent with $\eta_{inh}$=0.85.

Further, from the results of the IR analysis, no acid anhydride bond was detected.

In this system, the acylated oligomer prior to the intiation of the third step was found to contain 38.4 equivalent of terminal OH groups and 32.5 equivalent of terminal COOH groups (each inclusive of acetylated groups) relative to 100 equivalent of —OCH2CH20— groups, whereby the terminal OH groups—the terminal COOH groups =5.9.

Whereas, the terminal OH groups and the terminal COOH groups of the charged polyethylene terephthalate oligomer, and the formed ether component, were 20 equivalent, 12 equivalent and 26 equivalent, respectively, relative to 100 equivalent of —OCH$_2$CH$_2$O— groups. Therefore, the terminal OH groups—the terminal COOH groups prior to the initiation of the third step is calculated to be 20−12−26×2+25×2= +6, which substantially corresponds to the above result.

EXAMPLE 9

The same operation as in Example 7 was conducted except that 4.125 g of hydroquinone and 4.125 g of resorcinol were used instead of 8.25 g of hydroquinone in Example 7. The polymer thus obtained had $\eta_{inh}$ of 3.60. Even after drying in an oven at 120° C. for 130 hours, $\eta_{inh}$ was 0.59.

From the results of the IR analysis, no acid anhydride bond was detected.

EXAMPLE 10

Into a glass polymerizer equipped with a stirrer, a nitrogen inlet and a vacuum port, 44.2 g (0.32 mol) of p-hydroxybenzoic acid, 30.7 g (0.16 mol as the aunt of repeating units) of polyethylene terephthalate oligomer ($\eta_{inh}$=0.10 dl/g), 30.0 g (0.18 mol) of t-butyl hydroquinone and 26.6 g (0.16 mol) of terephthalic acid were charged, and stirred at 220° C. under a nitrogen stream for 2 hours to obtain a copolymeric oligomer. Then, the temperature was permitted to drop to 140° C. in about 30 minutes. Then, 81.6 g (0.8 mol) of acetic anhydride was dropwise added thereto over a period of 30 minutes, and stirring was continued under such a condition for further 1 hour for acylation. Then, the temperature of the oil bath was raised to 275° C. over a period of 2 hours. Then, 0.068 g of zinc acetate dihydrate was added, and the pressure was gradually reduced. After the system was evacuated to a level of 0.3 mmHg, polymerization was conducted for 4 hours. The product was taken out by breaking the glass polymerizer, chipped and then vacuum-dried at 130° C. overnight. The polymer thus obtained was transparent, and $\eta_{inh}$=0.81.

This polymer was further dried in an oven at 120° C. for 130 hours, whereby the heat stability was excellent with $\eta_{inh}$=0.80.

EXAMPLE 11

Into a glass polymerizer equipped with a stirrer, a nitrogen inlet and a vacuum port, 33.1 g (0.24 mol) of p-hydroxybenzoic acid and 46.1 g (0.24 mol as the amount of repeating units) of polyethylene terephthalate oligomer $\eta_{inh}$=0.01 dl/g) were charged, and stirred at 240° C. under a nitrogen stream for 2 hours to obtain a copolymeric oligomer.

Then, the temperature was permitted to drop to 140° C. in about 30 minutes, and then 22.0 g (0.20 mol) of hydroquinone and 26.6 g (0.16 mol) of terephthalic acid were charged and reacted for about 10 minutes. Ten, 75.1 g (0.74 mol) of acetic anhydride was charged and acylation was conducted. The rest of the operation was the same as in Example 1. The polymer thus obtained had $\eta_{inh}$=0.89.

This polymer was further dried in an oven at 120° C. for 130 hours, whereby the heat stability was excellent with $\eta_{inh}$=0.88.

We claim:
1. A process for preparing a copolymeric polyester, which comprises:
    (a) preparing a copolymeric oligomer by reacting a starting material oligoester or polyester having repeating units of the formula:

wherein R$^1$ is (i) a divalent aromatic hydrocarbon group having from 6 to 20 carbon atoms where a hydrogen atom in the aromatic ring of the aromatic hydrocarbon group may be substituted by a halogen atom or an alkyl or alkoxy group having from 1 to 4 carbon atoms, (ii) a divalent alicyclic hydrocarbon group having from 4 to 20 carbon atoms, (iii) a divalent aliphatic hydrocarbon group having from 1 to 40 atoms, or (iv) combinations thereof; and R2 is (i) divalent aliphatic hydrocarbon group having from 2 to 40 carbon atoms, (ii) a divalent alicyclic hydrocarbon group having from 4 to 20 carbon atoms, (iii) a divalent radical of polyalkylene oxide having a molecular weight of from 80 to 8000, or (iv) combinations thereof, in an amount of from 5 to 95 mol % as represented by the amount of the repeating units constituting the oligoester or polyester, with from 5 to 95 mol % of a hydroxycarboxylic acid of the formula:

HO—R$^3$COOH (B)

wherein R$^3$ is a divalent aromatic hydrocarbon group having from 6 to 20 carbon atoms on its aromatic ring, said aromatic ring having a hydrogen atom substituted by a halogen atom or an alkyl or alkoxy group having from 1 to 4 carbon atoms, said copolymer oligomer thereby containing repeating units of the formula:

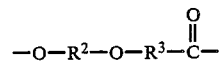

wherein R$^2$ and R$^3$ are as defined above and containing terminal —OH groups and —COOH groups in unbalanced amounts where the terminal —COOH groups are present in excess of the terminal —OH groups:
    (b) adding acetic anhydride as an acylating agent to the oligomer copolymer obtained, thereby acylating the same, and, wherein at any time prior to the completion of the second step, adding (i) a dihydroxyl compound of the formula:

HOR$^4$OH (C)

wherein R$^4$ has the same meaning as R$^1$ in formula A above, or adding (i), the compound of the formula (c), and (ii) the compound of the formula:

HOOCR$^5$COOH (D)

wherein R$^5$ has the same meaning as R$^1$ in the formula A above for reaction with oligomer being acylated; and (c) polymerizing the acylated oligomer under reduced pressure.

2. The process according to claim 1, wherein only the compound of the formula C is added to the oligomer undergoing acylation in an amount of from 1 to 100 mol % of the hydroxycarboxylic acid compound of the formula B.

3. The process according to claim 1, wherein when both compounds of formulas C and D are added to the oligomer being acylated under the conditions of the total amount of the compounds of formulas A and B ranging from 5 to 95 mol % relative to the total amount of ingredients of formulas A, B, C and D, the total amount of the compounds of formulas C and D ranging from 5 to 95 mol %, and the compound of formula C being employed in an amount which is at least stoichiometric to the amount of compound of formula D employed.

4. The process according to claim 3, wherein the amount of the compounds of formulas C and D ranges from 80 to 20 mol % relative to the total amount of the compounds of formulas A and B ranging from 20 to 80 mol %.

5. The process according to claim 1, wherein at least 60% of radical Rl in formula A of the oligomer is constituted of the 1,4-phenylene group.

6. The process according to claim 1, wherein radical R2 in formula A of the oligomer is an aliphatic hydrocarbon group having from 2 to 6 carbon atoms.

7. The process according to claim 1, wherein radical R1 in formula A of the oligomer is a 14 phenylene group.

8. The process according to claim 1, wherein radical R2 in formula A of the oligomer is an aliphatic hydrocarbon group having two carbon atoms.

9. The process accoring to claim 1, wherein radical R3 in formula B of the hydroxycarboxylic acid compound is a 1,4-phenylene group, a 1,3-phenylene group, or combinations thereof.

10. The process according to claim 1, wherein the reaction of the hydroxycarboxylic acid compound of formula B with the polyester or oligoester is conducted at a temperature ranging from 200° to 350° C.

11. The process according to claim 1, wherein in the reaction of said hydroxycarboxylic acid compound with said polyester or oligoester, the reaction continues until no more than 70 mol % of the hydroxycarboxylic acid compound remains unreacted.

12. The process according to claim 1, wherein the polymerization reation in step C is conducted at a temperature ranging from 200° to 350° C. while the pressure in the polymerization system is gradually reduced to 760 mm Hg to a level of 1 mm Hg over a perio of at least 30 minutes.

13. The process accoring to claim 1, wherein the intrinsic viscosity of the polymer product prepared is at least 0.3 dl/g.

14. The process according to claim 1, wherein said hydroxycarboxylic acid compound of formula B is p hydroxybenzoic acid, 4-hydroxy-3-chlorobenzoic acid, n hydroxybenzoic acid, 4-hydroxy-3,5-dimethylbenzoic acid, 2-oxy-6-naphthoic acid, 1-oxy-5-naphthoic acid, 1-hydroxy-4-naphthoic acid, syringic acid, vanillic acid or 4-hydroxy-3-methylbenzoic acid.

15. The process according to claim 1, wherein said dihydroxyl compound of formula C is a member slected from the group consisting of hydroquinone, resorcinaol, methylhydroquinone, chlorohydroquinone, acetylhydroquinone, acetoxyhydroquinone, nitrohydroquinone, dimethylaminohydroquinone, 1,4 dihyroxynaphthol, 1,5-dihydroxynaphthol, 1,6 ihydroxynaphthol, 2,6-dihydroxynaphthol, 2,7 dihydroxynaphthol, 2,2'-bis(4-hydroxyphenyl)propane, 2,2'-bis(4-hydroxy-3,5-dimethylphenyl)propane, 2,2'-bis(4-hydroxy-3,5-dichlorophenyl)propane, 2,2, bis(4-hydroxy-3-methylphenyl)-propane, 2,2,bis(4 hydroxy-3-chlorophenyl)propane, bis(4 hydroxyphenyl)methane, bis(4-hydroxy-3,5 dimethylphenyl)methane, bis(4-hydroxy-3,5 dichlorophenyl)methane, bis(4-hdyroxy-3,5 dibromophenyl)methane, 1,1-bis(4 hydroxyphenyl)cyclohexane, 4,4,-dihydroxydiphenylbis(4-hdyroxyphenyl)-ketone, bis(4-hydroxy-3,5 dimethylphenyl)-ketone, bis(4-hydroxy-3,5 dichlorophenyl)-ketone, bis(4-hydroxyphenyl)sulfide, bis(4-hydroxy-3-chlorophenyl)sulfide, bis(4 hydroxyphenyl)sulfone and bis(4-hydroxy-3,5 dichlorophenyl)ether.

* * * * *